(12) United States Patent
Harding

(10) Patent No.: US 12,135,484 B2
(45) Date of Patent: Nov. 5, 2024

(54) LIQUID CRYSTAL DEVICES

(71) Applicant: Flexenable Technology Limited, Cambridge (GB)

(72) Inventor: Matthew James Harding, Cambridge (GB)

(73) Assignee: Flexenable Technology Limited, Cambridge (GB)

( * ) Notice: Subject to any disclaimer, the term of this patent is extended or adjusted under 35 U.S.C. 154(b) by 0 days.

(21) Appl. No.: 18/151,063

(22) Filed: Jan. 6, 2023

(65) Prior Publication Data

US 2023/0140871 A1 May 11, 2023

Related U.S. Application Data

(63) Continuation of application No. 16/760,586, filed as application No. PCT/EP2018/079921 on Nov. 1, 2018, now Pat. No. 11,573,465.

(30) Foreign Application Priority Data

Nov. 3, 2017 (GB) ..................................... 1718268

(51) Int. Cl.
*G02F 1/1347* (2006.01)
*G02F 1/133* (2006.01)
(Continued)

(52) U.S. Cl.
CPC ...... *G02F 1/13471* (2013.01); *G02F 1/13306* (2013.01); *G02F 1/133528* (2013.01);
(Continued)

(58) Field of Classification Search
CPC ................. G02F 1/1341; G02F 1/1337; G02F 1/133528; G02F 1/13306; G02F 1/13471;
(Continued)

(56) References Cited

U.S. PATENT DOCUMENTS

| 5,625,474 A | 4/1997 | Aomori et al. |
| 6,812,974 B1 | 11/2004 | Hinata et al. |

(Continued)

FOREIGN PATENT DOCUMENTS

| CN | 1282066 A | 1/2001 |
| CN | 1409137 A | 4/2003 |

(Continued)

OTHER PUBLICATIONS

Search Report from Great Britain Patent Application No. 1718268.4, dated Apr. 12, 2018.
(Continued)

*Primary Examiner* — Hoan C Nguyen
(74) *Attorney, Agent, or Firm* — Dergosits & Noah LLP; Todd A. Noah

(57) ABSTRACT

A technique of producing a liquid crystal device, comprising: providing an assembly comprising a liquid crystal material contained directly between a polariser component and a first control component including a stack of layers defining electrical control circuitry; and containing further liquid crystal material directly between said polariser component of said assembly and another control component including another stack of layers defining electrical control circuitry.

6 Claims, 4 Drawing Sheets

(51) Int. Cl.
*G02F 1/1335* (2006.01)
*G02F 1/1337* (2006.01)
*G02F 1/1341* (2006.01)

(52) U.S. Cl.
CPC .......... *G02F 1/1337* (2013.01); *G02F 1/1341* (2013.01); *G02F 2201/50* (2013.01)

(58) Field of Classification Search
CPC .......... G02F 1/133305; G02F 2201/50; G02F 1/1347; G02F 1/1323; G02F 1/13452; G02F 1/136286; G02F 1/1368; G02F 1/133526; G02F 1/1362; G02F 1/1333; G02F 1/1363; G02F 1/133638; G02F 1/1393; G02F 2413/01; G02F 2413/04; G02F 2413/07; G02F 2413/12; G02F 1/216; G09G 2300/023; G09G 2300/0426; G09G 2300/0439; G09G 2310/0275; H04N 13/359; H04N 13/305; G02B 5/3016; G02B 5/3083; G02B 5/3033; G02B 5/305; G02B 5/22; C09K 2323/031; B32B 2457/202; B32B 2307/42

See application file for complete search history.

(56) References Cited

U.S. PATENT DOCUMENTS

| | | | | |
|---|---|---|---|---|
| 10,114,253 | B2 * | 10/2018 | Kwon | G02F 1/1333 |
| 2003/0067683 | A1 | 4/2003 | Tsuchimoto et al. | |
| 2003/0174399 | A1 | 9/2003 | Kusumoto et al. | |
| 2006/0108065 | A1 * | 5/2006 | Wang | G02B 5/3033 |
| | | | | 428/327 |
| 2007/0139584 | A1 | 6/2007 | Jin et al. | |
| 2008/0123025 | A1 | 5/2008 | Li et al. | |
| 2013/0088669 | A1 | 4/2013 | Lee et al. | |
| 2014/0168546 | A1 * | 6/2014 | Magnusson | G02F 1/1333 |
| | | | | 349/13 |
| 2016/0026014 | A1 | 1/2016 | Zhao | |
| 2017/0331076 | A1 * | 11/2017 | Misono | G09F 9/30 |
| 2018/0052342 | A1 | 2/2018 | Chang et al. | |
| 2020/0201104 | A1 * | 6/2020 | Reeves | G09F 9/301 |

FOREIGN PATENT DOCUMENTS

| | | |
|---|---|---|
| CN | 1445564 A | 10/2003 |
| CN | 106444185 A | 2/2017 |
| EP | 1072931 A2 | 1/2001 |
| GB | 2134299 A | 8/1984 |
| JP | 55-105287 A | 8/1980 |
| JP | S61-267085 A | 11/1986 |
| JP | S62280820 A * | 12/1987 |
| JP | H07333640 A | 12/1995 |
| JP | 11-15012 A | 1/1999 |
| JP | 2000-47248 A | 2/2000 |
| JP | 2001-42349 A | 2/2001 |
| JP | 2001075075 A | 3/2001 |
| JP | 2004-258372 A | 9/2004 |
| JP | 2010097118 A | 4/2010 |
| KR | 20100005265 A | 1/2010 |
| KR | 10-2013-0045029 A | 5/2013 |
| TW | 200925724 A | 6/2009 |
| TW | 201516489 A | 5/2015 |
| WO | 2009128115 A1 | 10/2009 |
| WO | 20130127204 A1 | 9/2013 |
| WO | 2015046936 A1 | 4/2015 |
| WO | 2015109751 A1 | 7/2015 |

OTHER PUBLICATIONS

International Search Report and Written Opinion in International Patent Application No. PCT/EP2018/079921, dated Jan. 7, 2019.
Examination Report from Great Britain Patent Application No. 1718268.4, dated Jul. 14, 2022.

* cited by examiner

LIQUID CRYSTAL DEVICES

CROSS-REFERENCE TO RELATED APPLICATIONS

This application is a continuation of U.S. patent application Ser. No. 16/760,586, filed Apr. 30, 2020, which is a U.S. National Phase of International Patent Application No. PCT/EP2018/079921, filed Nov. 1, 2018, which claims priority to Great Britain Patent Application No. 1718268.4, filed Nov. 3, 2017, both of which are incorporated herein by reference in their entireties.

BACKGROUND

Some techniques of producing liquid crystal display devices involve combining two liquid crystal (LC) cells in series to improve one or more aspects of the optical output. One conventional technique involves first preparing two LC cells each comprising a LC material contained between two support components and sandwiching a polariser component between the two LC cells.

The inventors for the present application have developed a new approach to combining LC cells.

There is hereby provided a method of producing a liquid crystal device, comprising: providing an assembly comprising a liquid crystal material contained directly between a polariser component and a first control component including a stack of layers defining electrical control circuitry; and containing further liquid crystal material directly between said polariser component of said assembly and another control component including another stack of layers defining electrical control circuitry.

According to one embodiment, containing said further liquid crystal material comprises bringing said assembly to said another control component together via a controlled volume of said further liquid crystal material.

According to one embodiment, containing said further liquid crystal material comprises bringing said assembly and said another control component together, and delivering said further liquid crystal material into a space between said assembly and said another control component.

According to one embodiment, said polariser component comprises no more than a single component laminated to each side of a polariser element.

According to one embodiment, said polariser component comprises two protection films laminated to opposite sides of a polariser element, and alignment layers coated over outer surfaces of said protection films.

There is also hereby provided a device comprising liquid crystal material contained directly between a first control component including a stack of layers defining electrical control circuitry and a polariser component, and further liquid crystal material contained directly between said polariser component and another control component including another stack of layers defining further electrical control circuitry.

According to one embodiment, said polariser component comprises no more than a single component laminated to each side of a polariser element.

According to one embodiment, said polariser component comprises two protection films laminated to opposite sides of a polariser element, and alignment layers coated over outer surfaces of said protection films.

There is also hereby provided a polariser component comprising a polariser element, and an alignment layer on at least one side of the polariser element; the alignment layer capable of controlling the director of a LC material interfacing the alignment layer in a LC cell.

According to one embodiment, the polariser component comprising alignment layer on both opposite sides of the polariser element.

According to one embodiment, the polariser component comprises at least one alignment layer provided over a protection film laminated to said polariser element.

BRIEF DESCRIPTION OF THE DRAWINGS

An embodiment of the present invention is described in detail hereunder, by way of example only, with reference to the accompanying drawings, in which.

DETAILED DESCRIPTION

In one example embodiment, the technique is used for the production of an organic liquid crystal display (OLCD) device, which comprises an organic transistor device (such as an organic thin film transistor (OTFT) device) for the control component. OTFTs comprise an organic semiconductor (such as e.g., an organic polymer or small-molecule semiconductor) for the semiconductor channels.

An embodiment of the present invention is described below for the example of using polariser elements comprising iodine crystalline needles in stretched plastic films, but the technique is equally applicable to the use of other kinds of polariser elements.

Figure 1A:
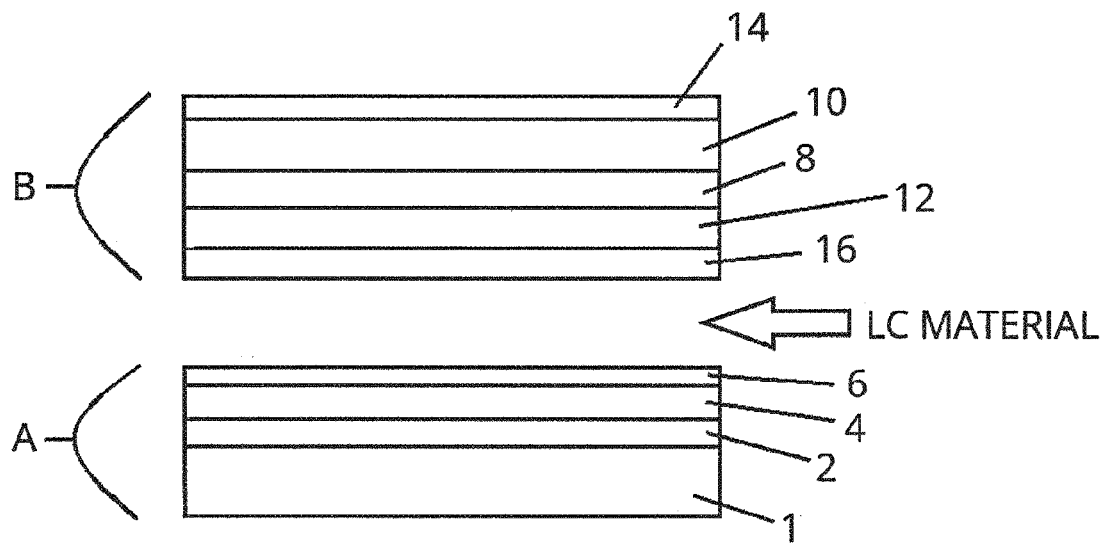
FIGS. 1A-1C illustrate a production technique according to an embodiment of the present invention.
Figure 1B:
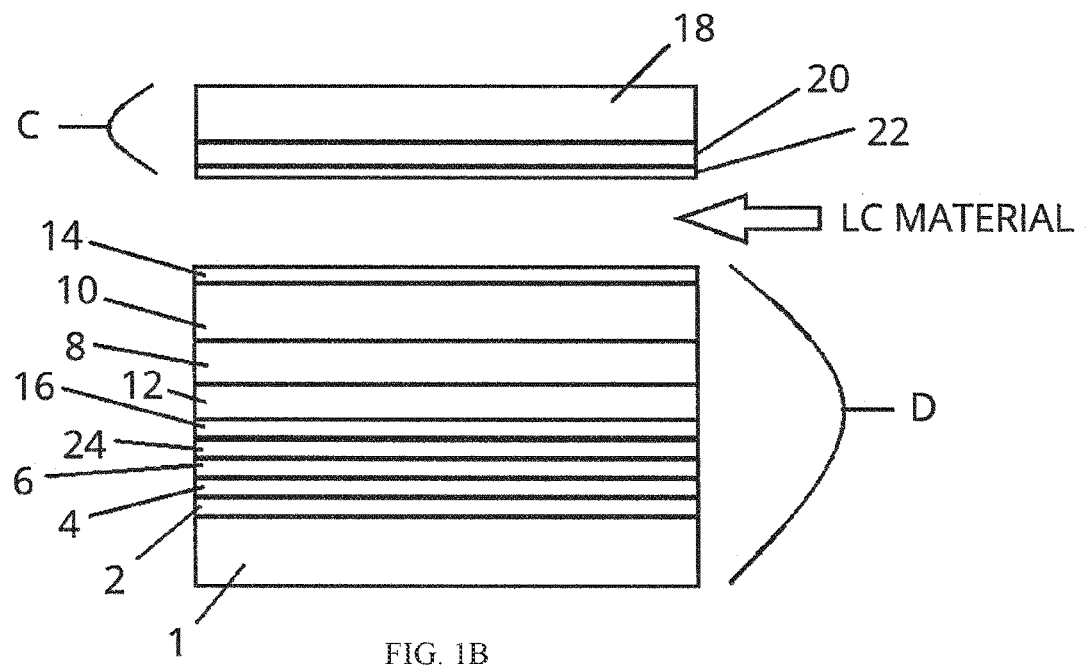
Figure 1C:
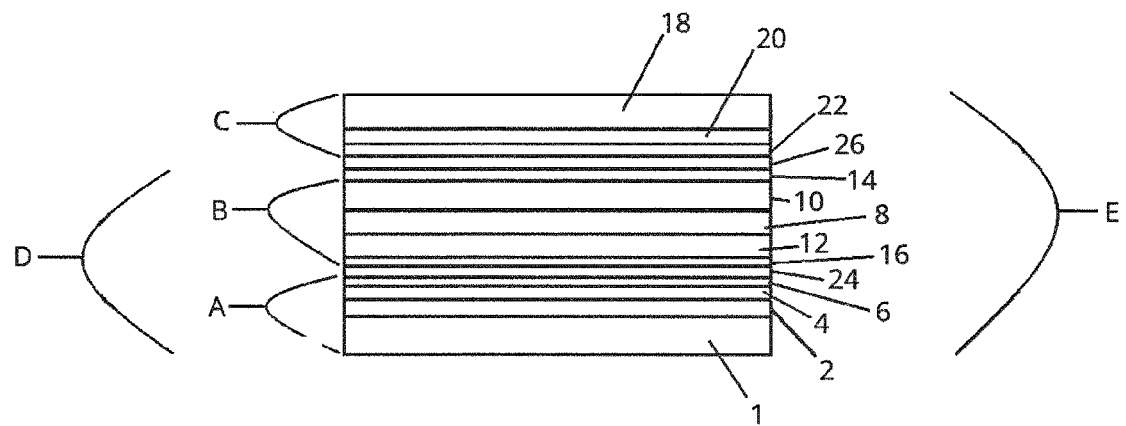

With reference to FIGS. 1(A) to 1(C), LC material is contained directly between a first backplane component A and a polariser component B to create a first LC cell assembly D, and then the first LC cell assembly D is itself used as one half of a second LC cell with further LC material contained directly between the polariser component B of the first LC cell assembly D and a second backplane component C to create a second LC cell in optical series with the first LC assembly.

In this embodiment, the first backplane component A comprises a support substrate 1, such as a glass substrate or a plastic support film (e.g., a tri-acetyl cellulose (TAC) film) supporting a stack of layers 2 defining electrical control circuitry for electrically controlling one or more optical properties of a LC material in the first LC cell of the LCD device. For example, the stack of layers 2 may comprise conductor, semiconductor and insulator layers defining an array of pixel electrodes 30 and an array of transistors for controlling the electric potential at each pixel electrode 30.

In this embodiment, the first backplane component A additionally comprises a colour filter array 4 applied to the support substrate 1 and including sets of red, green and blue filters, each aligned with a respective pixel electrode 30 of the pixel electrode array of the first backplane component A. An upper surface of the first backplane component A (outer surface at the opposite side of the pixel electrode array to the support substrate 1) is constituted by an alignment coating 6 which controls the director (which represents the direction of preferred orientation of the liquid crystal molecules), of local liquid crystal material of the first LC cell (and thus, together with the alignment coating 16 on the other side of the LC material 24 of the first LC cell, the transmittance of the first LC cell), in the absence of an electric field applied via the electrical control circuitry. The alignment coating 6 may, for example, comprise a thin polymer coating (e.g., a thin polyimide coating) rubbed in a single direction with a cloth.

In this embodiment, the polariser component B comprises a polariser element 8 sandwiched between two plastic protection films 10, 12 (e.g., two TAC films). In this embodiment, the polariser element 8 constitutes a stretched polyvinylalcohol (PVA) film coated (before stretching) with iodine crystalline needles, the PVA polymer chains being aligned substantially unidirectionally, and the iodine needles being aligned substantially parallel to the PVA polymer chains. The above-mentioned protection films 10, 12 are then laminated to opposite surfaces of the polariser element 8 using adhesive.

Both opposing, outer surfaces of the polariser component B are constituted by alignment coatings 14, 16 of the kind described above for the first backplane component A.

Depending on the type of LCD device, the polariser component B may additionally comprise one or more conductor films to function as one or more common conductor planes. For some types of LCD devices, such as in-plane-switching (IPS) and fringe-field-switching devices (FFS) devices, the polariser component B does not comprise any common conductor plane; the electrical field for controlling the director of the LC material is generated between conductor elements within the backplane component A.

A first LC cell is created by containing a liquid crystal material 24 between the alignment coating 6 at the upper surface of the first backplane component A and an alignment coating 16 at an outer surface of the polariser component B. Spacer elements (not shown) are used to ensure a substantially uniform thickness of LC material across the whole array of pixel electrodes of the first backplane component A. The spacer elements may be separate to both the first backplane component A and polariser component B (e.g., spacer balls) or may form an integral part of one or more of the first backplane component A and polariser component B.

Containing (sandwiching) the LC material between the first backplane component A and polariser component B may, for example, be achieved by (a) bringing the two components A, B together via adhesive/sealant material in selected locations (either according to a linear process involving simultaneously compressing the whole of the two components together while both in a flat configuration, or according to a roller lamination process in which successive portions of the two components are brought together and compressed together in turn using one or more pressure rollers) and then delivering the LC material into one or more spaces (created by the spacer elements) between the two components A, B by e.g. a vacuum technique; or (b) applying LC material to one of the two components A, B either before during the process of bringing the two components A. B together (either by the linear or roller lamination process mentioned above) via adhesive/sealant material in selected locations, by which the applied LC material is forcibly spread substantially uniformly over at least the area of the pixel electrode array of the first backplane component A.

As discussed below, in addition to providing a first LC cell, the resulting LC cell assembly D also provides one half of a second LC cell in optical series with the first LC cell.

A second backplane component C also comprises a support substrate 18, such as a glass substrate or plastic support film (e.g., a tri-acetyl cellulose (TAC) film) supporting a stack of layers 20 defining electrical control circuitry for electrically controlling one or more optical properties of a LC material 26 in the second LC cell of the dual cell display device. For example, the stack of layers may comprise one or more conductor, semiconductor and insulator layers defining an array of pixel electrodes 30 and an array of transistors for controlling the electric potential at each pixel electrode 30 substantially independently of the electric potential at any other pixel electrode.

Unlike the first backplane component A, the second backplane component C does not comprise a colour filter array in this embodiment. An upper surface of the second backplane component C (outer surface at opposite side of the pixel electrode array to the support substrate) is constituted by an alignment coating 22 of the kind already described above for the first backplane component A and the polariser component B.

The second LC cell is created by containing a liquid crystal material 26 between the alignment coating 22 at the upper surface of the second backplane component C and an alignment coating at the outer surface of the first LC cell assembly D (remaining outer surface of the polariser component B in situ in the first LC cell assembly D). Spacer elements (of the kind described above for the first LC cell assembly) are used to ensure a substantially uniform thickness of LC material 26 across the whole array of pixel electrodes 32 of the second backplane component C. As with the first LC cell assembly D, containing the LC material 26 between the second backplane component C and the polariser component B (in situ in the first LC cell assembly D) may, for example, be achieved by (a) bringing the first LC cell assembly D and second backplane component C together via adhesive/sealant material in selected locations (either according to a linear process involving simultaneously compressing the whole of the two components together while both in a flat configuration, or according to a roller lamination process in which successive portions of the two components are brought together and compressed together in turn using one or more pressure rollers), and then delivering the LC material into one or more spaces (created by the spacer elements) between the first LC cell assembly D and the second backplane component C by, e.g., a vacuum technique; or (b) applying LC material to one or both of the first LC cell assembly D and the second backplane component C either before or during the process of bringing the two components together (either according to the linear or roller lamination processes mentioned above) via adhesive/sealant material in selected locations.

Figure 2:
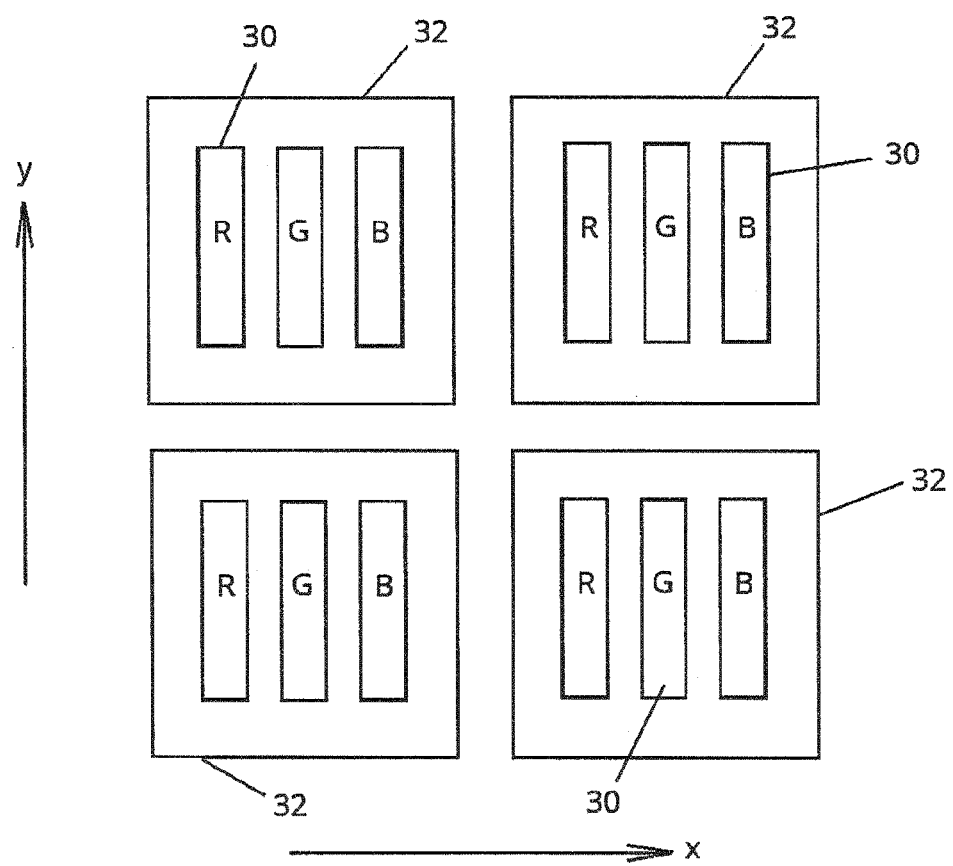
FIG. 2 illustrates an example of a relationship between the pixels of the two LC cells of a dual LC assembly according to an embodiment of the present invention.

When creating the second LC cell, a conventional alignment technique is used to align the pixel electrode array of the first backplane component A (in the first LC cell assembly D) to the pixel electrode array of the second backplane component C. In one example illustrated in FIG. 2, the second backplane component C (without the colour filter array) is designed to have less and larger pixels than the first backplane component (including the colour filter array), with each pixel 32 of the second backplane component C occupying the combined area of a respective set of red, blue and green pixels 30 of the first backplane component A, and overlapping (extending laterally beyond) the respective set of red, blue and green pixels 30 of the first backplane component A by a substantially equal amount in both the orthogonal x and y directions. FIG. 2 only shows a small number of pixels, but an LCD device will typically comprise a large number of pixels.

After creating the second LC cell, further polariser components (not shown) are applied to the outer surfaces of the dual cell assembly E. Each of the further polariser components may comprise a polariser element of the kind described above for the middle polariser component B laminated on both sides to protection films of the kind described above for the middle polariser component B. According to one variation, the outer polariser components could form a part of the two backplane components prior to assembling the two LC cells, and polariser components may be used as the support substrates 1, 18 of the two backplanes.

Further components may be applied to one or both outer surfaces of the dual cell assembly E, such as, e.g., a pair of transparent encapsulation films to protect the dual cell assembly E against air species such as oxygen and moisture, and a backlight component.

In this embodiment, the second backplane component is used as a brightness modulator to modulate the amount of light that can be emitted from the display screen independently for each set of three RGB sub-pixels, and thereby achieve optical display outputs with higher contrast ratios.

The technique described above facilitates the production of dual LC cell displays that (i) are less affected by the shadow image phenomenon known as parallax; (ii) exhibit less image defects and uniformity problems known as mura; (iii) allow a wide range of viewing angles.

The above-described technique may involve bringing together flexible components (e.g., (i) the kind of backplane component described above comprising a plastic support film as the support substrate or a first cell assembly including such a backplane component, and (ii) the kind of polariser component described above) that are susceptible to distortion upon heating and cooling; and the technique may involve temporarily adhering said components to relatively rigid carriers (e.g., glass plates) for the assembly process, and later releasing the assembly from the carriers.

One example of a linear process for compressing together flexible components via spacer structures using rigid carriers is described in UK Patent Application No. 1608279.4 and International Patent Application No. PCT/EP2017/061319, from which content is reproduced below.

With reference to FIGS. 3A-3E, a first flexible component 48 is releasably secured to a rigid carrier 44 via an adhesive element 46, whose strength of adhesion to both the rigid carrier 44 and the flexible component is sufficiently high during processing of the assembly to resist excessive thermal expansion of the flexible component 48, but which either is (i) not too high to prevent peeling of the adhesive element 46 away from at least the assembly after processing or (ii) can be reduced after processing of the assembly to facilitate release of the adhesive element 46 from at least the assembly. For example, this adhesive element 46 may be a single layer of pressure-sensitive adhesive, or a single layer of adhesive whose adhesion strength to one or more of the first flexible component 48 and rigid carrier 44 can be reduced by increasing temperature (heat release), by reducing temperature (cold release) or by exposure to UV radiation (UV release). The adhesive element 46 may also comprise two layers of adhesive on opposite sides of a support film, which two layers may, for example, comprise any combination of a pressure-sensitive adhesive, a heat release adhesive, cold release adhesive and UV release adhesive.

A second flexible component 412 is releasably secured to another rigid carrier 416 via a dual-sided adhesive unit 14 comprising a support film 414b supporting a layer of heat-release adhesive 414c adjacent to the carrier 416 and a second layer of adhesive 414a adjacent to the flexible component 412. In this example, the second layer of adhesive 414a is one whose strength of adhesion to the second flexible component 412 is sufficiently high during processing of the assembly to resist excessive thermal expansion of the assembly, but which either (i) is not too high to prevent peeling of the adhesive element away from the assembly after processing, or (ii) can be reduced after processing of the assembly to facilitate release of the adhesive element 414a from the assembly. The second layer of adhesive 414a may, for example, comprise (a) a pressure-sensitive adhesive, (b) a layer of heat-release adhesive having a higher release temperature than the first layer of adhesive 414c. (c) a layer of cold-release adhesive, or (d) a layer of UV-release adhesive.

In this example, at least one of the flexible components 48, 412 is provided with a heat-curable adhesive for securing the two flexible components together. The two flexible components 48, 412 are then aligned to one another (e.g., means of alignment marks included as part of the second flexible component and observable from above via the optically transparent carrier (e.g., glass) 44, optically transparent adhesive element 46, and optically transparent first flexible component 48) and mechanically compressed together (FIG. 3B) between the carriers 44, 416 via spacer structures 410. While under mechanical compression, the assembly (and carriers 44, 416) is uniformly heated in an oven (so as to establish a zero temperature gradient across the assembly) under conditions at which the adhesive between the two flexible components 48, 412 of the assembly becomes completely cured. Whether or not the adhesive between the two flexible components is completely cured can, for example, be determined by subjecting the assembly to a peel strength test and comparing the measured peel strength against a known or pre-determined maximum peel strength for the specific adhesive being used. Also, where the uncured form of the adhesive has a damaging effect on, e.g., liquid crystal material to be contained within the assembly between the two flexible components, the existence of uncured adhesive (i.e., a failure to completely cure the adhesive) manifests itself as a degradation in the performance of the liquid crystal display device.

This heating may involve raising the temperature of the oven in a series of steps and maintaining the oven at each step temperature for a respective period of time. The heating required to cure the adhesive involves raising the temperature of the assembly to a temperature where crinkling of the plastic support films within the assembly tends to occur, but as discussed below, the pressure at which the assembly is mechanically compressed between the carriers is sufficiently high to substantially prevent any significant crinkling.

Figure 4:
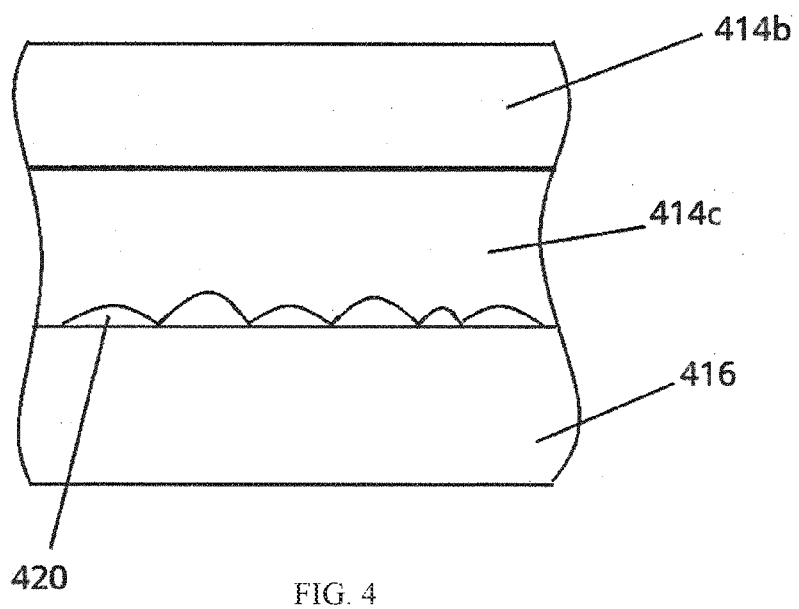
FIG. 4 illustrates an example of a process by which an adhesive layer is released from a carrier.

After sufficient heating has been performed to completely cure the adhesive between the two flexible components 48, 412, the temperature of the oven is reduced and the assembly and carriers inside the oven are allowed to cool, while continuing to mechanically compress the assembly between the two carriers to prevent crinkling of the plastic films during the cooling process. In this example, the adhesives used for the adhesive element 46 (between the first flexible component and the rigid carrier 4) and the adhesive used for adhesive layer 414a all retain their strength of adhesion to the assembly/carrier during the heating process to completely cure the adhesive between the two flexible components 48, 412. On the other hand, the heat-release adhesive for adhesive layer 414c is a material at which gas is generated during the process of heating the assembly to cure the adhesive between the two flexible components 48, 412. As described below with reference to FIG. 4, the generated gas forms pockets of gas 420 at the interface of the adhesive layer 414c with the rigid carrier 416, and the formation of these gas pockets 420 serves to partially reduce the strength of adhesion between the adhesive layer 414c and the carrier 416. The pressure at which the assembly is compressed between the two carriers 44, 416 is both (i) sufficiently low to retain the gas generated in the adhesive layer 414c as pockets of gas 420 at the interface between the adhesive layer 414c and the carrier 416 (i.e., to prevent gas generated within the adhesive layer 414c from being expelled laterally out from between the adhesive layer 414c and the carrier 416, but (ii) sufficiently high to prevent crinkling (distortion out of the plane) of the plastic support films within the assembly during the process of heating the assembly to cure the adhesive between the two flexible components.

The generation of gas within the adhesive layer 414c and the retention of generated gas at the interface of the adhesive layer 414c with the carrier 416 can be detected by: performing the heating in a vacuum and monitoring changes in pressure within the vacuum chamber, and/or remotely analysing, by, e.g., spectroscopy, the interface between the adhesive layer 414c and the carrier 416.

Figure 3A:
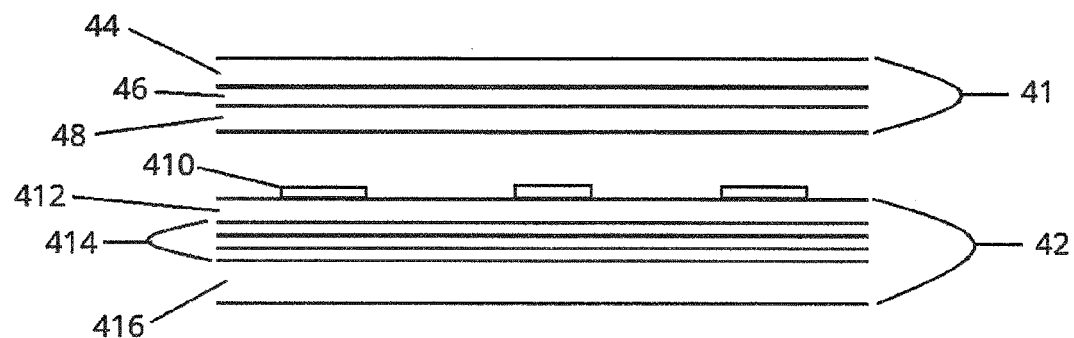
FIGS. 3A-3E illustrate an example of a technique for bringing two flexible components together.
Figure 3B:
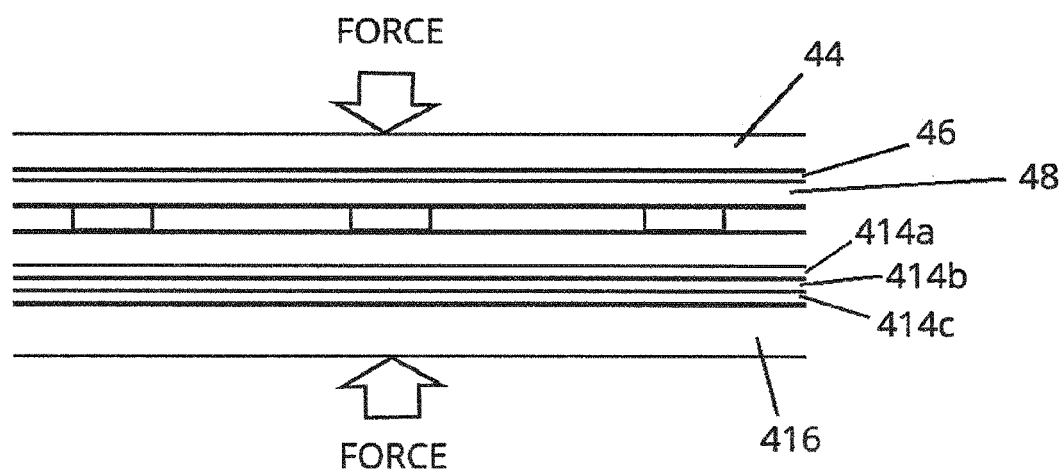
Figure 3C:
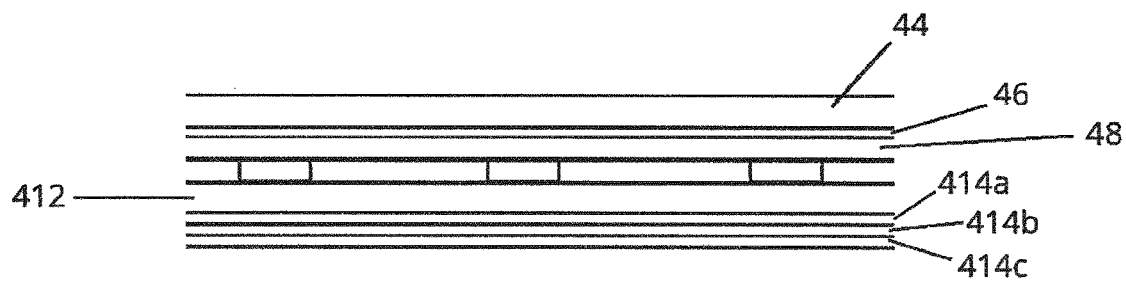

After cooling the assembly to a temperature at which the plastic support films within the assembly no longer tend to crinkle (during which cooling, the gas pockets 420 continue to be retained at the interface of the adhesive layer 414c with the rigid carrier 416), mechanical compression of the assembly between the carriers is ended, and the combination of assembly and carriers 44, 416 is placed on a hotplate with the carrier 416 adjacent to adhesive layer 414c closest to the surface of the hotplate, such that a temperature gradient is established across the combination of adhesive element 414 and assembly. Without mechanically compressing the assembly between the carriers 44, 416, the hotplate is used to raise the temperature of the adhesive layer 414c to a temperature at which, in the absence of mechanical compression, the adhesive layer 414c thermally expands to an extent sufficient to further reduce the strength of adhesion between the adhesive layer 414c and the rigid carrier 416. This further heating of the adhesive layer 414c is done without increasing the temperature of the assembly to a temperature at which significant crinkling of the plastic support films within the assembly tends to occur. In one example, the temperature to which the adhesive layer 414c is raised may be above the maximum temperature that it reached during the heating process for curing the adhesive between the two flexible components 48, 412. However, release of the carrier 416 during this second heating stage can also be achieved at lower temperatures. The thermal expansion of the adhesive layer 414 during this second heating stage reduces the strength of adhesion between the adhesive material and the carrier 416 in the areas of contact around the gas pockets 420 at the interface between the carrier 416 and the adhesive layer 414c; and this further reduction in the strength of adhesion between the carrier and the adhesive layer 414c allows the carrier to be released from the assembly without the application of mechanical force or with the application of only minimal mechanical force (FIG. 3C).

Figure 3D:
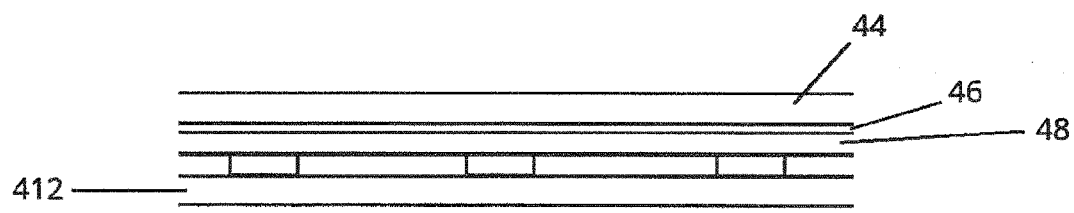
Figure 3E:
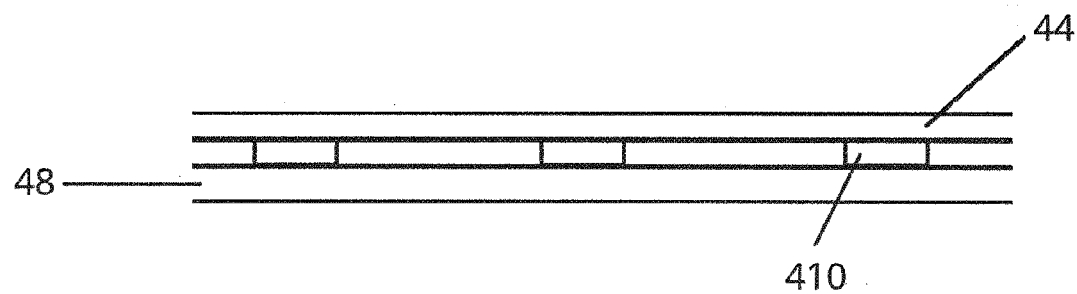

The release of one rigid carrier 416 facilitates the peeling of the whole adhesive unit 414 from the assembly (FIG. 3D) and the subsequent peeling of the assembly away from adhesive unit 6 (FIG. 3D).

By way of example: an adhesive product acquired from Nitto Denko Corporation and identified by product name RAU-5HD1.SS was used for one of the adhesive units 414 in the technique described above; and an adhesive product acquired from Nitta Corporation and identified by product name CX2325CA3 was used for the other adhesive unit 46 in the technique described above. The adhesive product identified by product name RAU-5HD1.SS comprises a heat-release adhesive and a UV-release adhesive on opposite sides of a flexible support film, and the adhesive product identified by product name CX2325CA3 comprises a cold-release adhesive and a pressure sensitive adhesive supported on opposite sides of a flexible support film.

In the above-described example, the adhesive layer 414c adjacent to the carrier is the layer whose strength of adhesion to an adjacent element is partially reduced under mechanical compression during the heating process to cure the adhesive between the two carriers, and further reduced (without mechanical compression) after completion of the heating process to cure the adhesive between the two carriers. However, in an alternative example, this layer may be the adhesive layer 414a adjacent to the assembly in the adhesive unit 414 (whereby the adhesive unit 414 is first released from the assembly), or this layer may be a single layer of adhesive in contact with both the assembly and the carrier.

In the example described above, a heat-curable adhesive is used to secure the two flexible components together, but (a) an adhesive curable by exposure to, e.g., UV radiation (UV-curable adhesive), (b) pressure-sensitive adhesive, or (c) an adhesive curable by laser, are other examples of adhesives that may be used to secure the two flexible components together. Even when the application of heat is not required to secure the two flexible components together, heating the assembly to a temperature at which crinkling of the plastic support films within the assembly tends to occur may be used for other purposes; and the above-described technique is equally useful in such situations.

In addition to any modifications explicitly mentioned above, it will be evident to a person skilled in the art that various other modifications of the described embodiment may be made within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

What is claimed is:

1. A method of producing a liquid crystal device, comprising:
   combining the first control component including a stack of layers defining electrical control circuitry and a flexible polariser component to provide an assembly comprising a liquid crystal material contained directly between a flexible polariser component and the first control component, the flexible polariser component comprising a stretched polymer polariser film and no more than a single plastics film laminated to each side of the stretched polymer polariser film; and
   thereafter combining the flexible polariser component and another control component including another stack of layers defining electrical control circuitry while the flexible polariser component is already combined with the first control component, and containing further liquid crystal material directly between the flexible polariser component of the assembly and the another control component.

2. The method according to claim 1, wherein containing the further liquid crystal material comprises delivering the further liquid crystal material into a space between the assembly and the another control component.

3. The method according to claim 1, wherein the flexible polariser component comprises alignment layers coated over outer surfaces of the plastics films.

4. The method according to claim 1, comprising delivering the further liquid crystal material between the flexible polariser component and the another control component while the flexible polariser component is already combined with the first control component.

5. The method according to claim 1, comprising pressing together the flexible polariser component and the another control component via adhesive and curing the adhesive, while the flexible polariser component is already combined with the first control component.

6. The method according to claim 1, wherein combining the flexible polariser component and the another control component while the flexible polariser component is already combined with the first control component comprises: adhering the first control component to a first carrier; adhering the another control component to a second carrier; thereafter pressing the first and second carriers together; and thereafter releasing the first carrier from the first control component, and releasing the second carrier from the another control component.

* * * * *